United States Patent
Gupta et al.

(10) Patent No.: US 7,553,564 B2
(45) Date of Patent: Jun. 30, 2009

(54) TERNARY CARBIDE AND NITRIDE MATERIALS HAVING TRIBOLOGICAL APPLICATIONS AND METHODS OF MAKING SAME

(75) Inventors: Surojit Gupta, Philadelphia, PA (US); Thirumalai G. Palanisamy, Morristown, NJ (US); Michel Barsoum, Moorestown, NJ (US); Chien-Wei Li, Livingston, NJ (US)

(73) Assignee: Honeywell International Inc., Morristown, NJ (US)

( * ) Notice: Subject to any disclaimer, the term of this patent is extended or adjusted under 35 U.S.C. 154(b) by 522 days.

(21) Appl. No.: 11/127,522

(22) Filed: May 10, 2005

(65) Prior Publication Data
US 2006/0088435 A1 Apr. 27, 2006

Related U.S. Application Data

(60) Provisional application No. 60/575,041, filed on May 26, 2004.

(51) Int. Cl.
*B32B 18/00* (2006.01)
(52) U.S. Cl. .................... 428/698; 428/685; 428/699
(58) Field of Classification Search .................. 75/243, 75/244; 501/87, 98.4; 428/627, 685, 698, 428/699
See application file for complete search history.

(56) References Cited

U.S. PATENT DOCUMENTS

| 3,540,878 | A | * | 11/1970 | Levine et al. | 148/421 |
|---|---|---|---|---|---|
| 6,497,922 | B2 | * | 12/2002 | Knight et al. | 427/450 |
| 6,986,873 | B2 | * | 1/2006 | Sundberg et al. | 423/324 |
| 7,067,203 | B2 | * | 6/2006 | Joelsson et al. | 428/697 |
| 7,157,393 | B2 | * | 1/2007 | Gromelski et al. | 501/87 |
| 2003/0054940 | A1 | * | 3/2003 | Abe et al. | 501/96.4 |
| 2005/0287296 | A1 | * | 12/2005 | Wadley et al. | 427/248.1 |
| 2006/0194688 | A1 | * | 8/2006 | Sundberg et al. | 501/87 |

FOREIGN PATENT DOCUMENTS

WO 03/046247 * 6/2003

* cited by examiner

*Primary Examiner*—Roy King
*Assistant Examiner*—Ngoclan T Mai
(74) *Attorney, Agent, or Firm*—Ingrassia Fisher & Lorenz, P.C.

(57) ABSTRACT

A turbomachinery component includes a substrate having a surface, the surface being a material consisting essentially of at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3. The component is made by forming a compact and sintered substrate with the material, or by coating a substrate with the material.

8 Claims, 4 Drawing Sheets

US 7,553,564 B2

TERNARY CARBIDE AND NITRIDE MATERIALS HAVING TRIBOLOGICAL APPLICATIONS AND METHODS OF MAKING SAME

CROSS-REFERENCES TO RELATED APPLICATIONS

This application claims the benefit of U.S. Provisional Application No. 60/575,041, filed on May 26, 2004.

STATEMENT REGARDING FEDERALLY SPONSORED RESEARCH OR DEVELOPMENTROSS-REFERENCES TO RELATED APPLICATIONS

This invention was made with Government support under Contract Number N00421-03-C-0085 awarded by the U.S. Navy. The Government has certain rights in this invention.

TECHNICAL FIELD

The present invention relates to high temperature machinery, and more particularly relates to lubricants that reduce friction between, and thereby extend the workable life of, high temperature machinery such as turbomachinery components.

BACKGROUND

In the context of turbine engines, turbochargers use heat and volumetric flow of engine exhaust gas to pressurize or boost an intake air stream into a combustion chamber. Specifically, exhaust gas from the engine is routed into a turbocharger turbine housing. A turbine is mounted inside the housing, and the exhaust gas flow causes the turbine to spin. The turbine is mounted on one end of a shaft that has a radial air compressor mounted on an opposite end thereof. Thus, rotary action of the turbine also causes the air compressor to spin. The spinning action of the air compressor causes intake air to enter a compressor housing and to be pressurized or boosted before the intake air is mixed with fuel and combusted within an engine combustion chamber.

Solid lubricants are useful for reducing the weight, complexity, and reliability of various high temperature machinery such as turbochargers. Some examples of turbocharger components that would benefit from solid lubricants include the turbocharger shaft and the bearings that support the shaft. Some known solid lubricants include graphite fluoride/polymer composites and molybdenum disulfide. However, these materials may not be particularly useful for high temperature machinery since they are only stable at temperatures below about 250° C. Other known solid lubricants include silver, calcium fluoride, and barium fluoride, but performance for these materials is often substandard since they have relatively high porosity and can be difficult to coat.

Some high temperature airfoil coatings are also useful as solid lubricants. Examples of such airfoil coatings include hard nitride or carbide coatings, and metal-ceramic composite coatings that include embedded solid lubricants such as silver and calcium fluoride, and further include high temperature low-friction materials such as molybdenum sulfide. However, none of these existing coating materials or systems has an adequate friction coefficient, wear property, thermal stability, and load carrying capability over an operating temperature range for many turbocharger components and other high temperature machinery.

Hence, there is a need for methods and materials for manufacturing and/or coating turbomachinery or other machinery with a solid lubricant that has a low friction coefficient and a low wear rate against hard superalloy materials. There is a particular need for a self-lubricating or in situ lubricating material with ceramic-like oxidation resistant properties and metal-like fracture toughness.

BRIEF SUMMARY

The present invention provides a turbomachinery component, comprising a substrate having a surface, the surface being a material consisting essentially of at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3.

The present invention also provides methods of manufacturing a turbomachinery component. One method comprises the step of compressing and heating a powder mixture to form a compact substrate having the chemical formula $M_{n+1}AX_n$. The powder mixture consists essentially of: A, a powder consisting of at least one element selected from groups IIIA, IVA, VA, VIA, and VIIA; M, a powder consisting of at least one early transition metal selected from groups IIIB, IVB, VB, and VIB; and X, a powder consisting of one or both of carbon and nitrogen.

Another method of manufacturing a turbomachinery component comprises the step of coating a substrate with a material consisting essentially of at least one compound having the chemical formula $M_{n+1}AX_n$ as defined above.

Other independent features and advantages of the preferred methods will become apparent from the following detailed description, taken in conjunction with the accompanying drawings which illustrate, by way of example, the principles of the invention.

DETAILED DESCRIPTION OF A PREFERRED EMBODIMENT

Figure 1:
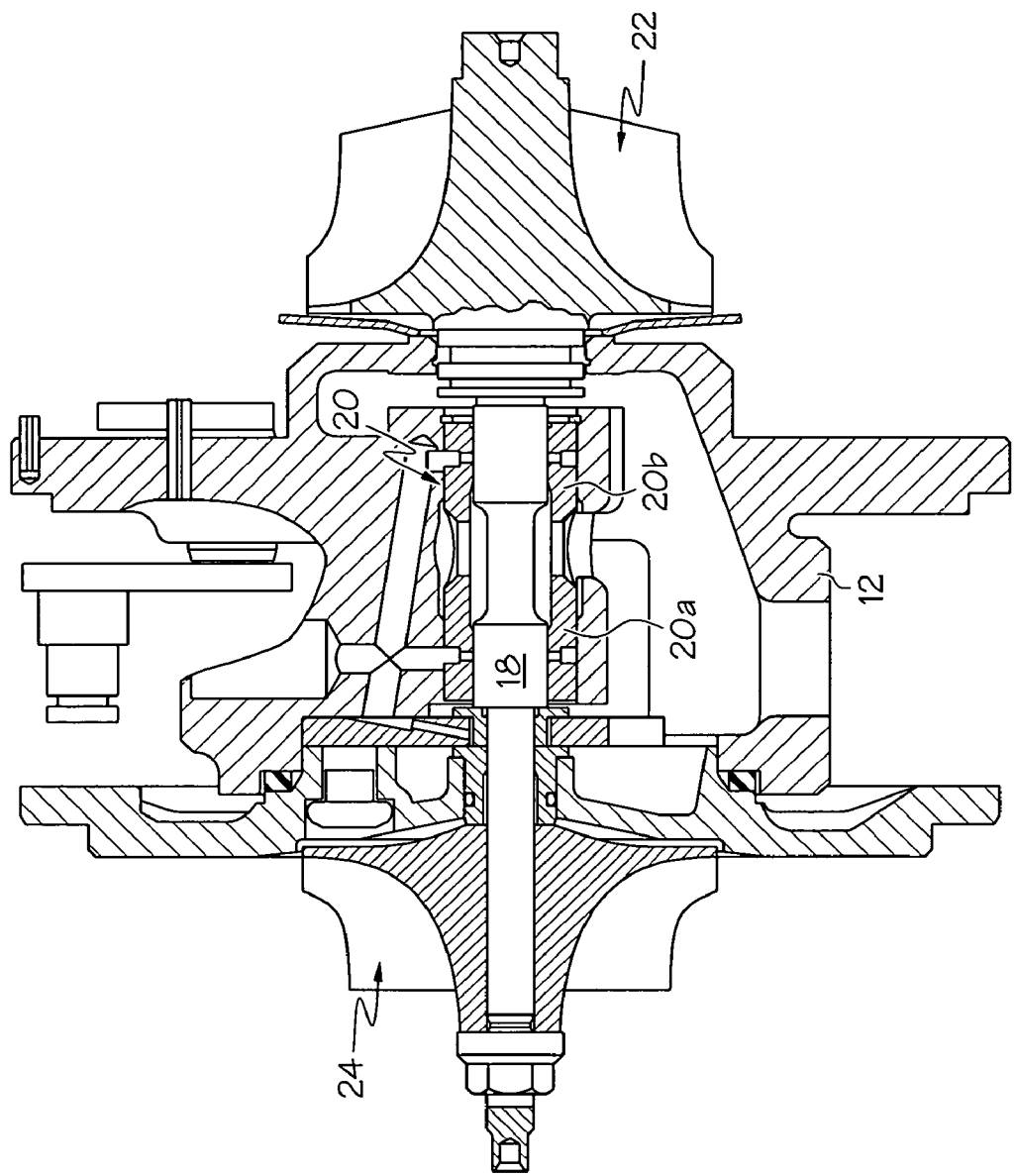
FIG. 1 is a cross-sectional side view of a turbocharger.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention provides materials that are useful as solid lubricants. The materials exhibit a low wear rate and a low coefficient of friction, particularly when they form a tribocouple with hard superalloys such as those commonly used to manufacture propulsion engines and other turbomachinery. Although the materials are useful as solid lubricants, they have sufficient hardness and strength for use as base structural materials. The materials are also easily applied as coatings for a variety of structural substrates.

The solid lubricant materials are a class of ternary compounds defined by the general composition $M_{n+1}AX_n$, hereinafter MAX, wherein M is an early transition metal selected from groups IIIB, IVB, VB, and VIB, A is an element selected from groups IIIA, IVA, VA, VIA, and VIIA, X is either carbon or nitrogen, and n is an integer between 1 and 3. Exemplary transition metals include scandium, titanium, vanadium, chromium, zirconium, niobium, molybdenum, hafnium, and tantalum. Exemplary group A elements include aluminum, gallium, indium, tellurium, silicon, geranium, tin, lead, phosphorus, arsenic, and sulfur.

Table I below displays preferred MAX ternary compounds, organized according by the A group in each compound. As set forth in the table, there are approximately fifty preferred $M_2AX$, or 2-1-1 compounds, three preferred $M_3AX_2$, or 3-1-2 compounds, and two preferred $M_4AX_3$, or 4-1-3 compounds that are suitable solid lubricants.

TABLE 1

| IIIA | IVA | VA | VIA |
| --- | --- | --- | --- |
| Al | Si | P | S |
| $V_2AlC$, | $Ti_3SiC_2$, | $V_2PC$, | $Ti_2SC$, |
| $Cr_2AlC$, | $Ti_3(Si,Ge)C_2$ | $Nb_2PC$ | $Zr_2SC$, |
| $Nb_2AlC$, | | | $Nb_2SC$, |
| $(Ti,Nb)_2AlC$, | | | $Hf_2SC$ |
| $Ta_2AlC$, | | | |
| $Ti_2AlC$, | | | |
| $Ti_2AlN_{0.5}C_{0.5}$, | | | |
| $Ti_2AlN$, | | | |
| $Ti_3AlC_2$, | | | |
| $Ti_4AlN_3$, | | | |
| $Ta_4AlC_3$ | | | |
| Ga | Ge | As | |
| $Ti_2GaC$, | $Ti_2GeC$, | $V_2AsC$, | |
| $V_2GaC$, | $V_2GeC$, | $Nb_2AsC$ | |
| $Cr_2GaC$, | $Cr_2GeC$, | | |
| $Nb_2GaC$, | $Ti_3GeC_2$ | | |
| $Mo_2GaC$, | | | |
| $Ta_2GaC$, | | | |
| $Ti_2GaN$, | | | |
| $Cr_2GaN$, | | | |
| $V_2GaN$ | | | |
| In | Sn | | |
| $Sc_2InC$, | $Ti_2SnC$, | | |
| $Ti_2InC$, | $Zr_2SnC$, | | |
| $Zr_2InC$, | $Nb_2SnC$, | | |
| $Nb_2InC$, | $Hf_2SnC$, | | |
| $Hf_2InC$, | $Hf_2SnN$ | | |
| $Ti_2InN$, | | | |
| $Zr_2InN$, | | | |
| $Hf_2InN$ | | | |
| Tl | Pb | | |
| $Ti_2TlC$, | $Ti_2PbC$, | | |
| $Zr_2TlC$, | $Hf_2PbC$, | | |
| $Hf_2TlC$, | $Zr_2PbC$ | | |
| $Zr_2TlN$ | | | |

MAX ternary compound phases are structured in a manner that enables their use in tribological applications. The materials form a phase that has a hexagonal (P6/mmc) crystal lattice structure in a rock salt-like layered configuration in which the group A elements are interleaved with $M_{n+1}X_n$ layers. The solid phases delaminate and deform at room temperature in a unique manner. Basal plane dislocations are mobile and they multiply at temperatures as low as about −196° C. (77 K). Further, the dislocations glide exclusively on the basal planes, and are almost substantially if not entirely arranged in arrays or kink boundaries. Single grains are capable of undergoing a combination of deformations including slip, kink band formation, and delamination, all of which are dislocation based.

Another unique property that the MAX materials share is the ability to undergo fully reversible plasticity. As a general principle, crystalline solids exhibit irreversible plasticity; the MAX materials are an exception to this principle. In fact, indentations made on $Ti_3SiC_2$ phases during plasticity experiments were not traceable due to the fully reversible plasticity for the MAX materials.

Many of the MAX materials are also elastically quite stiff. Some of the particularly stiff MAX materials include $Ti_3SiC_2$, $Ti_3AlC_2$, and $Ti_4AlN_3$. For example, at 320 GPa, $Ti_3SiC_2$ has a stiffness that is almost three times that of titanium metal, but the two materials have comparable densities of 4.5 g/cm³. Despite their high stiffness, the MAX materials are relatively soft, particularly when compared with the chemically similar transition metal carbides. The softness and high stiffness properties make the MAX materials readily machinable with relative ease. In fact, the MAX materials are machinable with basic tools such as a manual hacksaw or high-speed tool steels, generally without any need for lubrication or for cooling materials and processes.

Further, the MAX materials are damage tolerant and thermal shock resistant; they are highly fatigue resistant and oxidation resistant as well. Materials on which tests were conducted at temperatures as high as 800° C. exhibited high resistance to oxidation.

As previously mentioned, the MAX ternary compound materials can be used as structural materials, or as a solid lubricant protective coating for a variety of different high temperature machinery including turbomachinery. For example, high temperature airfoil shafts and bearings are needed for the next generation of high power density turbomachinery. The MAX materials provide high efficiency, lightweight, low maintenance, and low cost propulsion engine components or component coatings. Coatings of one or more MAX materials can be easily applied using conventional plating, deposition, and spraying methods.

Turning now to FIG. 1, a cross-sectional side view of an exemplary turbocharger is illustrated. The turbocharger generally comprises a central housing 12 in which a shaft 18 is rotatably disposed within a bearing assembly 20 including bearings 20a, 20b. A turbine or turbine wheel 22 is attached to one shaft end and is disposed within a turbine housing attached to the central housing 12 at one end. A compressor impeller 24 is attached to an opposite shaft end and is disposed within a compressor housing attached to the central housing 12 at and end opposite the turbine housing. The turbine and compressor housings are attached to the center housing by, for example, bolts that extend between the adjacent housings.

Some turbocharger components that can be made from or coated with one or more of the MAX materials include the bearing assembly 20 and the shaft 18. Tests performed at up to 650° C. reveal that the MAX materials form a good tribocouple with superalloys such as Inconel and Rene 41, which are sometimes used to make turbomachinery components such as bearing assemblies and shafts. The MAX materials provide low friction coefficients and low wear rates for such components. It is also emphasized again that turbocharger components are just one example of the type of high temperature machinery that can be manufactured or coated using the MAX materials. Further, tribological properties can be optimized by making or coating components using phases that include at least two MAX materials that are selected according to their individual features.

Figure 2:
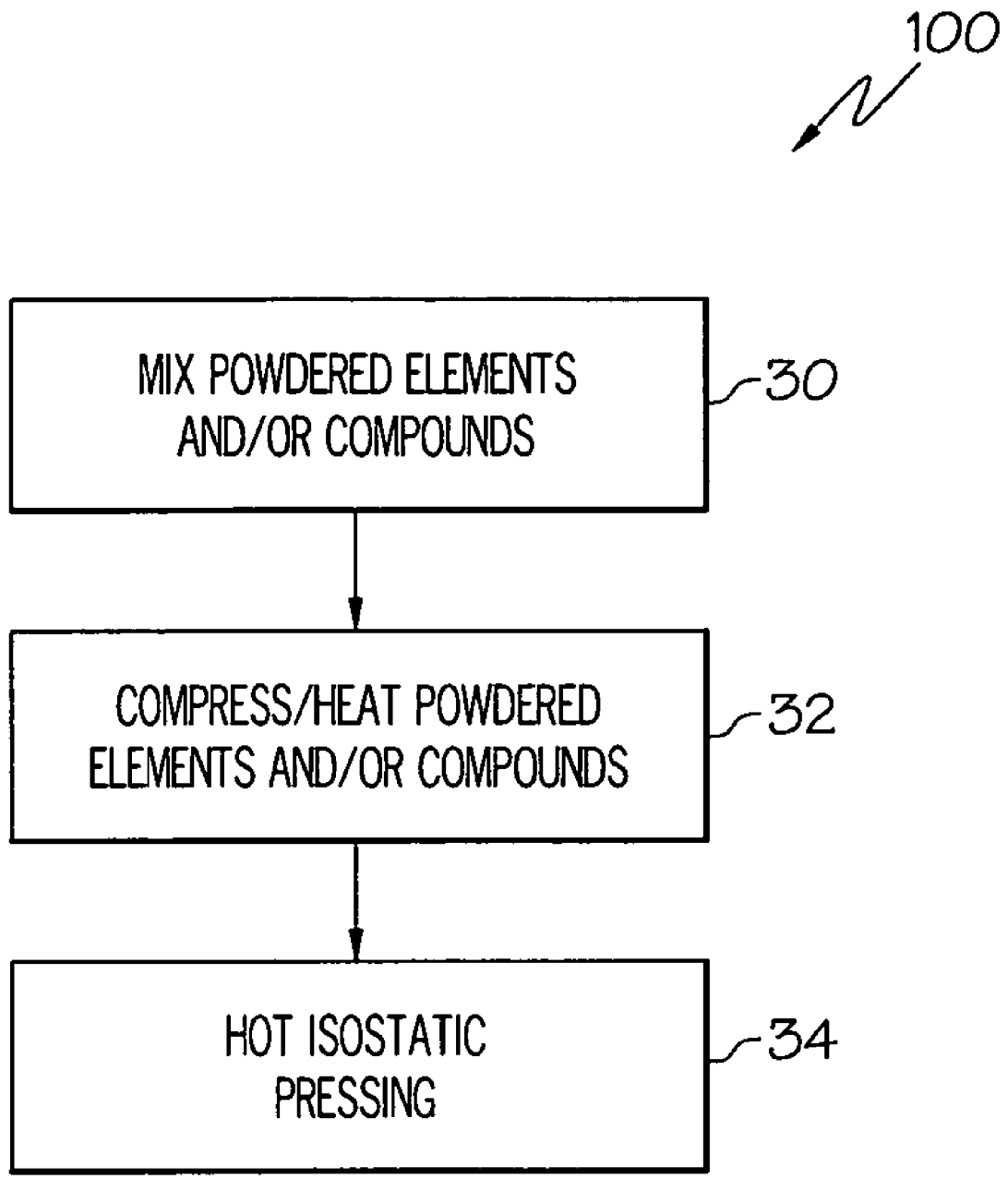
FIG. 2 is a flow diagram of an exemplary method for manufacturing a ternary carbide or nitride in accordance with the present invention.

Turning now to FIG. 2, an exemplary method 100 is illustrated for manufacturing a MAX material. While many of the MAX materials from Table 1 are already obtainable as powders at various grain sizes, others such as $Cr_2AlC$, $V_2AlC$, $Ta_2AlC$, $Ta_4AlC_3$, $Ti_2AlC$, $Ti_3AlC_2$, $Ti_4AlN_3$, and $Ti_2AlN$ can be efficiently manufactured using the present method. The MAX materials are at least about 95% pure, with some oxides, carbides, and/or nitrides as potential impurities.

The first step 30 comprises combining and mixing powders to form a substantially homogenous mixture. An exemplary powder mixture includes elemental powders, with each powder combined in stoichiometric proportions. For example, when preparing a 2-1-1 compound, molar equivalents (1×) of the group A element and the carbon or nitrogen are combined with two molar equivalents (2×) of the early transition metal. Another exemplary powder mixture comprises binary compounds such as carbides, nitrides, silicides, and so forth. Yet another exemplary powder mixture includes pre-reacted MAX compounds. The powders can be uniformly combined by ball milling or by using other suitable mixing procedures.

The next step 32 comprises compressing and heating the mixed powders to form a compact substrate. The compressing and heating steps can be performed simultaneously or in sequence. In an exemplary embodiment, the powders are initially compressed while heating the powders, and pressure is sustained as heat is increased and maintained until the powders are able to pre-react. Although conditions may vary among different materials, an exemplary heating step is performed for up to about ten hours while pressure is applied.

The final step 34 comprises performing a hot isostatic pressing (HIP) procedure on the powders. The HIP procedure is performed until the MAX material is formed and is essentially free of unreacted elemental powders. The HIP procedure is preferably a sinter HIP procedure, meaning that the HIP procedure forms a sintered, compact substrate. In an exemplary embodiment, the HIP procedure includes an initial temperature ramp, followed by pressurization using an inert gas, and followed in turn by additional temperature ramps. Although conditions may vary, an exemplary HIP procedure is performed for up to about twelve hours.

The following examples represent some tests performed on phases of aluminum-based carbides and nitrides having the MAX structure to determine their tribological properties. These examples in no way limit the scope of the invention, but are rather detailed in order to establish the best mode of making and using some of the MAX materials having good friction and wear properties at room temperature and at up to 650° C.

To start, a $Cr_2AlC$ sample was fabricated using the process described previously and outlined in FIG. 2. Particularly, chromium, aluminum, and graphite powders (≧99% pure, ~325 mesh) were mixed in stoichiometric proportions and ball milled in a plastic container with alumina balls for about one hour. The mixed powders were sealed in borosilicate glass tubes under mechanical vacuum and the tubes were collapsed and heated to about 650° C. for about ten hours, allowing the powders to pre-react.

The powder in the collapsed glass tubes was then transferred to a HIP apparatus. The powder was heated to about 650° C. at a rate of about 10° C./min. The powder was then heated to about 750° C. at a rate of about 2° C./min. The HIP chamber was then pressurized to about 70 MPa using argon gas. While the pressure was applied, the powder was heated to about 1200° C. at a rate of about 10° C./min; the pressure at 1200° C. was approximately 100 MPa. These conditions were maintained for about twelve hours.

After removing and cooling the compacted solid produced from the HIP procedure, backscattered field emission scanning electron microscopy (FESEM) micrographs and x-ray diffraction revealed that the $Cr_2AlC$ product was fully dense and predominantly single phase. Only about 2 vol. % $Al_2O_3$, and less than 3 vol. % chromium carbide was present as impurity phases. From secondary FESEM of fractured surfaces, the average grain size was estimated as 10±5 μm.

Friction tests were carried out using a high temperature tribometer to characterize the tribological properties of the $Cr_2AlC$ phase material. Friction and wear tests were performed by polishing cleaning a 2 mm thick $Cr_2AlC$ disc and other 10 mm thick superalloy discs and running the discs at linear speeds of 100 to 500 cm/s at a 3N load. Other tests were also performed at other speeds and loads. Samples were weighted before and after the tests to detect any material transfer or loss. The samples were also viewed under microscopes to determine roughness and changes in surface condition.

Table 2 outlines the test results from the $Cr_2AlC$ tribological tests against the superalloys Inconel-600, Inconel-718, and Rene-41. The friction and wear behavior of the Cr2AlC material was similar against all three of these superalloys. At room temperature, the friction coefficients were about 0.66 but decreased sharply with temperature, staying below 0.5 for most of the higher temperatures at which tests were performed. Wear also decreased sharply as temperature increased.

Figure 3:
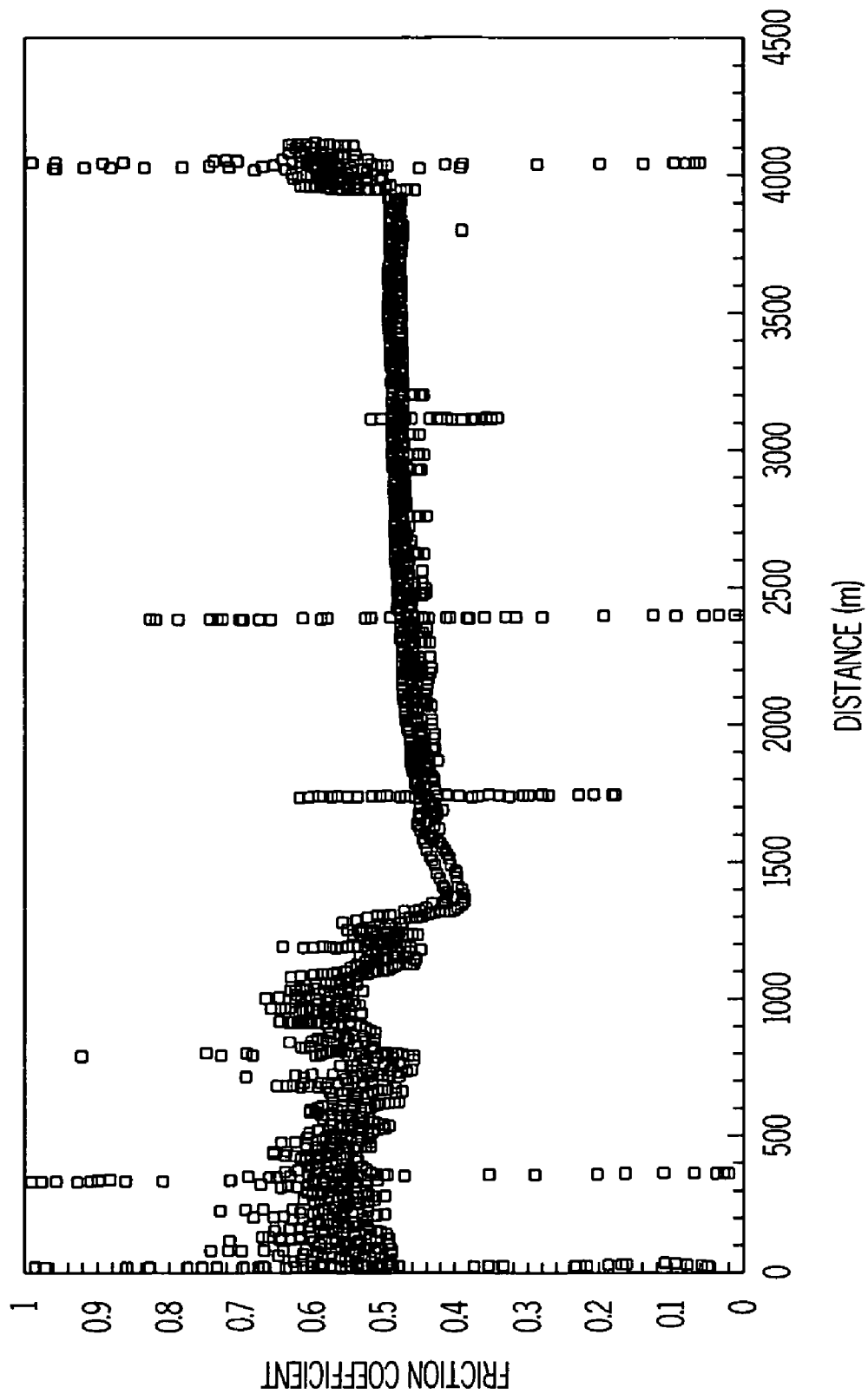
FIG. 3 is a graph that illustrates friction coefficients for $Cr_2AlC$ materials subjected to a mechanical cycling test.
Figure 4:
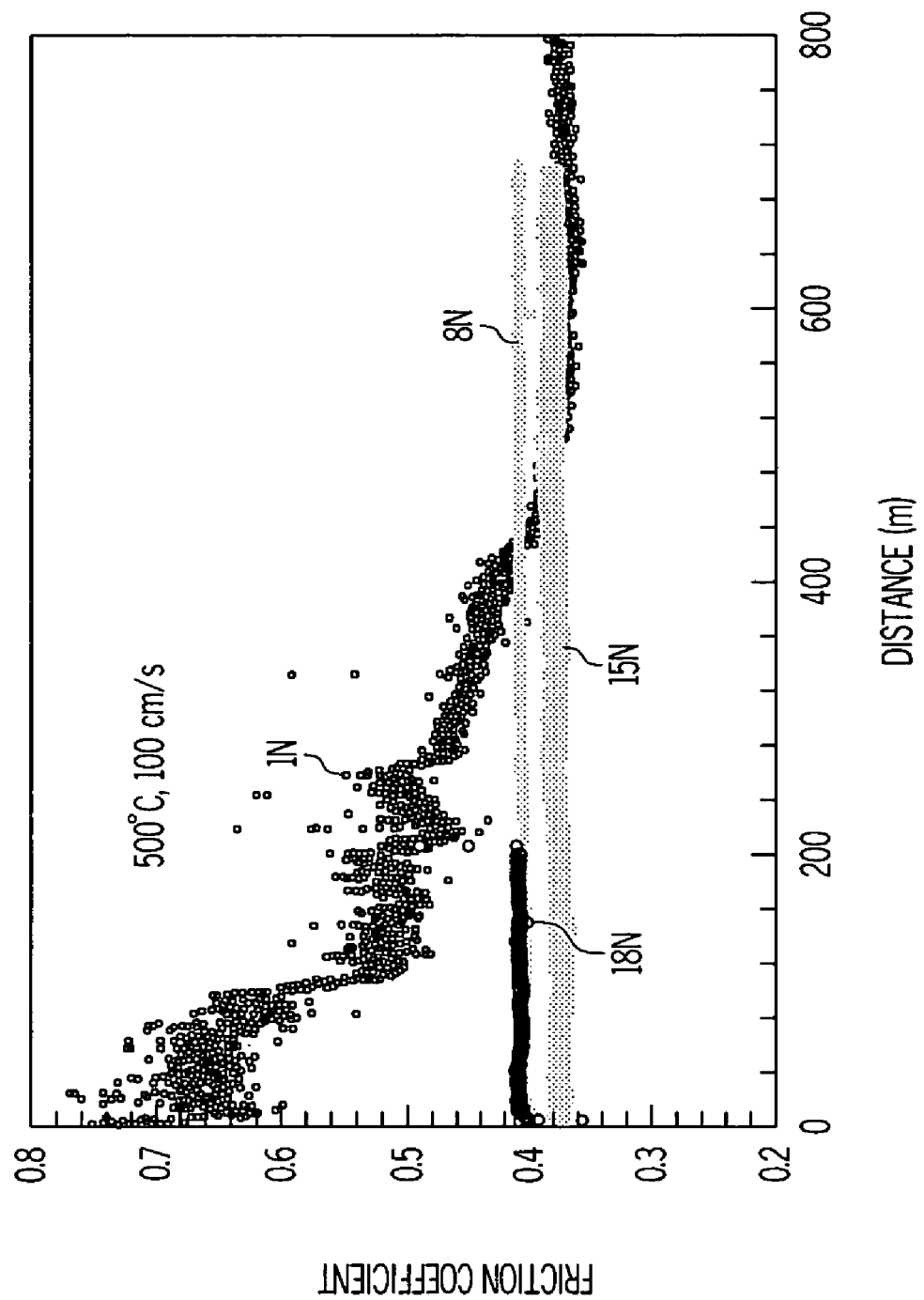
FIG. 4 is a graph that illustrates friction coefficients for $Cr_2AlC$ materials when subjected to different loads.

Similar tests were also performed for several other MAX materials, including $Ti_4AlN3$, $Ti_2AlN$, $Ti_3AlC_2$, and $V_2AlC$. Table 2 also outlines the test results for each of the additional MAX materials that were tested. In addition, stop and start cycle tests were performed for the $Cr_2AlC$ material to determine friction coefficient stabilities against mechanical cycling. FIG. 3 is a graph that illustrates the friction coefficients for the $Cr_2AlC$ materials subjected to the mechanical cycling test. Thermal cycling tests were also performed to determine whether particular MAX materials are able to undergo repeated temperature increases and decreases. Finally, tests were performed for the $Cr_2AlC$ material at 3N, 5N, 10N, and 18N to demonstrate the material's load carrying capability, although most applications using turbomachinery and other high temperature machinery involve only 1N to 2N loads. The results, illustrated in the graph of FIG. 4, reveal that the coefficient of friction equilibrates in a narrow range of 0.4 to 0.45 regardless of the load.

TABLE 2

| Material | Temperature | Wear Rate ($mg/cm^2 - s$) | Friction Coefficient ($\mu_{mean}$) |
|---|---|---|---|
| $Cr_2AlC$ | Room Temp. | 0.03 | 0.67 |
| $Cr_2AlC$ | 300° C. | $4 \times 10^{-4}$ | 0.43 |
| $Cr_2AlC$ | 500° C. | $2 \times 10^{-5}$ | 0.45 |
| $Cr_2AlC$♦♦ | Room Temp. | 0.03 | 0.665 |
| $Cr_2AlC$♦♦ | 500° C. | $5 \times 10^{-5}$ | 100 cm/s = 0.46 |
| | | | 200 cm/s = 0.51 |
| $Cr_2AlC$ Mechanical Cycling | 500° C. | $1 \times 10^{-6}$ | See FIG. 2 |
| $Cr_2AlC$ Multiple Loads | 500° C. | 0.03 | See FIG. 3 |
| $Ti_4AlN_3$♦ | Room Temp. | 3 | 0.8 |
| $Ti_4AlN_3$♦ | 500° C. | 0.06 (after entire cycle) | 100 cm/s = 0.6 |
| | | | 200 cm/s = 0.5 |
| | | | 300 cm/s = 0.44 |
| | | | 600 cm/s = 0.36 |
| $Ti_4AlN_3$♦♦ | Room Temp. | 5 | 0.8 |
| $Ti_4AlN_3$♦♦ | 500° C. | $3.5 \times 10^{-3}$ (after entire cycle) | 100 cm/s = 0.6 |
| | | | 300 cm/s = 0.4 |
| $Ti_2AlN$ | Room Temp. | 15 | 0.8 |
| $Ti_2AlN$ | 500° C. | $7 \times 10^{-4}$ | 100 cm/s = 0.63 |

TABLE 2-continued

| Material | Temperature | Wear Rate (mg/cm² – s) | Friction Coefficient ($\mu_{mean}$) |
|---|---|---|---|
| $Ti_3AlC_2$ | Room Temp. | 0.06 | 200 cm/s = 0.56<br>275 cm/s = 0.38<br>0.58 |
| $Ti_3AlC_2$ | 500° C. | $4 \times 10^{-4}$ | 0.6 |
| $V_2AlC$ | Room Temp. | 0.003 | 0.66 |
| $V_2AlC$ | 500° C. | $3 \times 10^{-4}$ | 0.5-0.6 |

*= The substrate used was Inconel-718.
**= The substrate used was Rene-41.
For all other samples, the substrate used was Inconel-600.
Unless otherwise listed, tests were performed at 3N, 100 cm/s.

The present invention thus provides materials that are useful as solid lubricants, particularly at high temperatures. The test results shown in Table 2 and the supporting figures illustrate that the MAX materials exhibit a low wear rate and a low coefficient of friction when they form a tribocouple with hard superalloys. It is again emphasized that the MAX materials have sufficient hardness and strength for use either as base structural materials or as coatings for a variety of structural substrates.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed herein as the best mode contemplated for carrying out this invention, but that the invention will include all embodiments falling within the scope of the appended claims.

We claim:

1. A turbomachinery component, comprising:
   a shaft; and
   a bearing assembly mounted to and in contact with the shaft,
   wherein:
   one of the shaft and the bearing assembly comprises a substrate having a first surface, the first surface consisting essentially of at least one compound having the chemical formula $M_{n+1}AX_n$, wherein M is at least one early transition metal selected from group VB, A is at least one element selected from group IIIA, X is carbon, and n is an integer between 1 and 3, and the at least one compound is organized as a solid phase having a rock salt crystal structure wherein the A components are interleaved with layers of the $M_{n+1}X_n$ components, and
   the other of the shaft and the bearing assembly comprises a second surface comprising a superalloy, the second surface in friction contact with the first surface.

2. The turbomachinery component according to claim 1, wherein the material comprises at least one aluminum-based compound selected from the group consisting of $V_2AlC$, and $Ta_4AlC_3$.

3. The turbomachinery component according to claim 1, wherein the substrate surface is a coating of the material consisting essentially of at least one compound having the chemical formula $M_{n+1}AX_n$.

4. A turbomachinery component, comprising:
   a shaft; and
   a bearing assembly mounted to and in contact with the shaft,
   wherein:
   one of the shaft and the bearing assembly comprises a substrate having a first surface, the first surface consisting essentially of at least one aluminum-based compound selected from the group consisting of $V_2AlC$, $Ta_2AlC$, and $Ta_4AlC_3$, and the other of the shaft and the bearing assembly comprises a second surface comprising a superalloy, the second surface in friction contact with the first surface.

5. A turbomachinery component, comprising:
   a shaft; and
   a bearing assembly mounted to and in contact with the shaft,
   wherein:
   one of the shaft and the bearing assembly comprises a substrate having a first surface, the first surface consisting essentially of at least one compound having the chemical formula $M_{n+1}AX_n$, wherein M is at least one early transition metal selected from the group consisting of V and Ta, A is at least one element selected from group IIIA, X is one or both of carbon and nitrogen, and n is an integer between 1 and 3 and
   the other of the shaft and the bearing assembly comprises a second surface comprising a superalloy, the second surface in friction contact with the first surface.

6. The turbomachinery component according to claim 5, wherein the group A element is at least one element selected from the group consisting of aluminum, gallium, indium, and tellurium.

7. The turbomachinery component according to claim 5, wherein the substrate surface is a coating of the material consisting essentially of at least one compound having the chemical formula $M_{n+}AX_n$.

8. The turbomachinery component according to claim 5, wherein the material consisting essentially of at least one compound having the formula $M_{n+1}AX_n$ is organized as a solid phase having a rock salt crystal structure wherein the A components are interleaved with layers of the $M_{n+1}X_n$ components.

* * * * *

UNITED STATES PATENT AND TRADEMARK OFFICE
CERTIFICATE OF CORRECTION

PATENT NO. : 7,553,564 B2
APPLICATION NO. : 11/127522
DATED : June 30, 2009
INVENTOR(S) : Surojit Gupta et al.

It is certified that error appears in the above-identified patent and that said Letters Patent is hereby corrected as shown below:

On the Title Page, Item (73), please add the following additional Assignee:

--Drexel University
Philadelphia, PA (US)--

Signed and Sealed this

Twenty-fourth Day of November, 2009

David J. Kappos
*Director of the United States Patent and Trademark Office*